United States Patent [19]
Harrison

[11] Patent Number: 5,679,235
[45] Date of Patent: Oct. 21, 1997

[54] TITANIUM AND CERIUM CONTAINING ACIDIC ELECTROLYTE

[75] Inventor: Stephen Harrison, Shawinigan, Canada

[73] Assignee: Hydro-Quebec, Montreal, Canada

[21] Appl. No.: 427,107

[22] Filed: Apr. 21, 1995

Related U.S. Application Data

[63] Continuation-in-part of Ser. No. 80,364, Jun. 18, 1993, Pat. No. 5,409,581, which is a continuation of Ser. No. 847,657, Mar. 5, 1992, Pat. No. 5,246,553.

[51] Int. Cl.$^6$ ........................... C25B 3/04
[52] U.S. Cl. ............... 205/334; 205/423; 205/424; 205/431; 205/437; 205/438; 205/440; 205/444; 205/446; 205/450; 205/770; 423/651; 502/173
[58] Field of Search ................ 204/72, 59 R; 423/651; 502/173; 205/334, 423, 424, 431, 437, 438, 440, 444, 446, 450, 770

[56] References Cited

U.S. PATENT DOCUMENTS

| | | | |
|---|---|---|---|
| 4,312,721 | 1/1982 | Oehr | 204/78 |
| 4,313,804 | 2/1982 | Oehr | 204/93 |
| 4,431,572 | 2/1984 | Karayannis et al. | 502/151 |
| 4,477,315 | 10/1984 | Tomaszewski | 205/243 |
| 4,536,337 | 8/1985 | Komatsu et al. | 260/396 |
| 4,536,377 | 8/1985 | Komatsu et al. | 260/396 |
| 4,632,782 | 12/1986 | Komatsu et al. | 260/396 R |
| 4,639,298 | 1/1987 | Kreh et al. | 204/59 R |
| 4,647,349 | 3/1987 | Kreh et al. | 204/59 R |
| 4,670,108 | 6/1987 | Kreh et al. | 204/59 R |
| 4,701,245 | 10/1987 | Kreh | 204/78 |
| 4,794,172 | 12/1988 | Kreh | 534/15 |
| 4,866,019 | 9/1989 | van Broekhoven | 502/65 |
| 5,032,291 | 7/1991 | Sublette | 210/757 |
| 5,246,553 | 9/1993 | Harrison et al. | 204/140 |
| 5,266,173 | 11/1993 | Bandlish et al. | 204/72 |
| 5,409,581 | 4/1995 | Harrison et al. | 204/72 |

FOREIGN PATENT DOCUMENTS

| | | |
|---|---|---|
| 1 132 996 | 10/1982 | Canada. |
| 1 166 600 | 5/1984 | Canada. |
| 1 191 811 | 8/1985 | Canada. |
| 0 075 828 | 9/1982 | European Pat. Off.. |

OTHER PUBLICATIONS

Comninellis CH. "Electrochemical production of ceric sulphate in concentrated $H_2SO_4$", Journal of Applied Electrochemistry, vol. 13 (1983) pp. 117–120 (no month).

Dalrymple, I.M. "An Indirect Electrochemical Process for the Production of Naphthaquinone" Journal of Applied Electrochemistry, vol. 13 (1986) pp. 885–893 (no month).

Kreh, Robert P. "Selective Oxidations with Ceric Methanesulfonate and Ceric Trifluoromethanesulfonate," Tetrahedron Letters, vol. 28, No. 10 (1987) pp. 1067–1068 (no month).

Pichaichanarong, P. "Simulation of a Mediated Electrochemical Process." Chem. Eng. Comm., vol. 94 (1990 pp. 119–130). (no month).

(List continued on next page.)

*Primary Examiner*—Arun S. Phasge
*Attorney, Agent, or Firm*—Limbach & Limbach

[57] ABSTRACT

An electrolyte contains a tetravalent salt of titanium and a trivalent salt of cerium in a methanesulfonic acid solution. A reducing agent consisting of trivalent titanium and an oxidizing agent consisting of tetravalent cerium are provided in the same solution. An electrochemical cell is disclosed wherein the catholyte and anolyte utilize this electrolyte. The reduction of tetravalent titanium into trivalent titanium is accomplished by electrolysis in the presence of extraneous trivalent cerium ions. The oxidation of trivalent cerium into tetravalent cerium is accomplished by electrolysis in the presence of extraneous tetravalent titanium ions. Simultaneous reduction of tetravalent titanium into trivalent titanium and oxidation of trivalent cerium to tetravalent cerium by electrolysis is also disclosed. Reduction of organic compounds using trivalent titanium in the presence of trivalent cerium in methanesulfonic acid is disclosed. Oxidation of organic compounds using tetravalent cerium in the presence of tetravalent titanium is disclosed.

21 Claims, 1 Drawing Sheet

OTHER PUBLICATIONS

Spotnitz, R.M. "Mediated Electrosynthesis with Cerium (IV) in Methanesulphonic Acid." Journal of Applied Electrochemistry, 90(2) (1990) pp. 209–215 (no month).

Kreh, Robert P. "Aromatic Aldehydres, Kentones and Quinones by Mediated Electrooxidation." in Genders J. Daivd, *Electrosynthesis From Laboratory To Pilot, To Production*, Chapter 10, (1990) (no month).

Drabowicz et al., "Organosulfur Compounds. XI. A mild and efficient reduction of sulfoxides by means of lithuim alanate and Titanium(IV) chloride". (1976) (abstract only). (no month).

TITANIUM AND CERIUM CONTAINING ACIDIC ELECTROLYTE

This application is a continuation-in-part of application Ser. No. 08/080,364, filed Jun. 18, 1993, now U.S. Pat. No. 5,409,581, which is a continuation of application Ser. No. 07/847,657, filed Mar. 5, 1992, now U.S. Pat. No. 5,246,553, which patent is incorporated by reference herein.

BACKGROUND OF INVENTION (a) Field of the Invention

The present invention relates to a liquid electrolyte useful for carrying out chemical reductions and oxidations. More particularly, the invention is concerned with a methanesulfonic acid containing electrolyte which can be used as both an anolyte and a catholyte. The electrolyte contains a tetravalent salt of titanium and a trivalent salt of cerium. The invention is also directed to an electrochemical process including the electrolyte of the invention, an electrolytic process for the simultaneous reduction of tetravalent titanium to trivalent titanium and the oxidation of trivalent cerium to tetravalent cerium. The trivalent titanium salt can be used as a reductant for organic molecules such as nitrobenzenes, sulfoxides or quinones, while the tetravalent cerium salt can be used as an oxidant of aromatic compounds to form quinones, aldehydes and ketones. Finally, the invention pertains to improved electrochemical methods for reducing chemical compounds using a solution of trivalent titanium in methanesulfonic acid while oxidizing other chemical compounds with tetravalent cerium in methanesulfonic acid.

(b) Description of the Prior Art

Redox reagents are compounds that can exist in an oxidized or reduced state. Usually, these compounds are transition metals such as iron, chromium, manganese, vanadium, etc. Great use has been made of these compounds in organic synthesis for the oxidation or reduction of reactive groups. Examples include the oxidation of methyl groups to aldehydes or acids, introduction of quinone groups to aromatic ring systems, the reduction of nitro groups to amines and the addition of hydrogen to unsaturated molecules.

The manufacture of anthraquinone from the chromic acid oxidation of anthracene, with subsequent re-oxidation of the chromic acid in an electrochemical cell is such an example. Such processes were used in the dyestuff industry in Germany as early as the turn of the century. Other processes involved the use of regenerated chromic acid to bleach montan wax, and the use of chromic acid to manufacture saccharine. Examples of using regenerated redox reagents abound in the literature of electrochemical synthesis. In some cases the redox reagents were added along with the organic substrate and the whole treated in an electrochemical cell. This is known as "in-cell" reaction. In other cases, the reagent was prepared electrochemically in solution, mixed with the organic substrate in a separate treatment, the so-called "ex-cell" method. This application concerns this latter approach.

Regardless of which system of redox manipulation is involved, the role of the redox reagent is to react easily and efficiently with the electrode on the one hand and the normally insoluble organic substrate on the other. The role of the redox reagent is then, in the case of oxidation, that of the oxygenator of the organic substrate, in which case it is itself reduced. The reduced redox form being both soluble and able to contact the anode in the cell without hindrance, it is then easily re-oxidised, ready for a further reaction with the organic substrate. In this way, redox reagents enhance both the reaction rate between poorly soluble reagents and the electrochemical transfer of electrons which accompanies oxidation or reduction of all chemical compounds.

Ideally, redox reagents are chosen for their ability to bridge the solubility gap between the reagent to be oxidized or reduced and the regenerating electrode. A further property of redox reagents to be considered in the selection for a particular process is the redox potential. This may be considered as a measure of a reagent's ability on a thermodynamic scale to oxidize or reduce other materials.

In the past, metals such as iron or zinc have been used in the presence of acids such as hydrochloric (in the Béchamp process) to reduce nitrobenzenes such as p-nitrotoluene and p-xylidene to their respective amines. However, these processes produce large quantities of contaminated metal oxides which require disposal and are therefore technologies which are damaging to the environment. Another process which can be used to reduce nitrobenzenes and other nitrated compounds is catalytic reduction with hydrogen. This technology, however, is capital-intensive and therefore dedicated equipment can only be justified for such a process when there is a large demand for the product.

The efficiency of the direct electrolytic reduction of nitrobenzenes is inhibited by their low solubility in the aqueous electrolyte and the poor conductivity of non-aqueous electrolytes in which these compounds are soluble.

The electrolytic reduction of titanium(IV) to titanium(III) is well known in acid media, such as hydrochloric and sulphuric acids.

In sulphate media, the faradaic efficiency is poor because of low solubility and in chloride media, it is difficult to find electrode material which can withstand the corrosive nature of the solution. On the other hand, it is well known to reduce nitrobenzenes at the cathode of electrolytic cells. The introduction of titanium(IV) into the electrolyte improves the faradaic efficiency of the reduction of nitrobenzenes. However, the low solubility of titanium(IV) in sulphate does not allow the ex-cell use of the then-reduced titanium(III).

The simultaneous generation of chromium and other redox agents including titanium has been disclosed by Chaussard, et al. in Canadian Patent 1,191,811. However, chromium(VI) is a powerful oxidising agent, and due to its oxygen-donating ability, it is less selective than cerium(IV) which is a more powerful oxidising agent. Thus, chromium (IV) is a preferred oxidising agent for producing organic acids such as benzoic acid. Unfortunately, however, these acids are, for the most part, produced more economically by direct oxidation with oxygen under catalytic conditions.

In recent independent patents, Bandlish, and Harrison and Boucher have discovered that a solution of tetravalent titanium in aqueous methanesulfonic acid solution has a number of advantages over sulfate, chloride and other media. These advantages include higher solubility for both tetravalent and trivalent species, and higher trivalent titanium stability on standing. These factors combined with good electrochemical cell design permit highly efficient electrochemical regeneration of the spent reductant once used for the reduction of, for example nitrobenzene and its derivative. Kreh, et al. have also found that methanesulfonic acid can be beneficial when used in conjunction with cerium (III)/(IV) redox couple. Again, solubility is a major factor as cerous ions can be made to dissolve to concentrations well in excess of one molar. And once again, efficiency gains are obtained due to the higher solubility. Further, oxidation reactions with ceric methanesulfonate are more rapid than similar oxidations in sulfate, chloride, acetate and nitrate media. Reactions are typically very selective and conversions often complete.

In the aforementioned patent of Harrison and Boucher, reference is made to the regeneration of ceric oxidant and titanium reductant in the same electrochemical cell. The cell is configured in such a way that the two solutions are maintained separately in the electrochemical cell by way of a cation exchange membrane (anion exchange membranes would be equally acceptable.) The flaw with this potentially efficient use of the electrolyte is the migration of water and cerium ions from the anolyte compartment to the catholyte compartment and that of methanesulfonate anions from the catholyte compartment to the anolyte compartment. The net result of this migration is a concentration of cerium ions and a general decrease in the acidity of the catholyte and a net increase in acidity and depletion of the cerium in the anolyte. The increase in acidity in the anolyte is potentially disastrous as cerium (III) precipitates at higher acidities, and as the acidity increases the oxidation-reduction potential is altered and reaction selectivity is affected. As a result, in a continuous operation, there is a need to control the acidity in the anolyte and the catholyte. This can be done by the addition of cerium carbonate and methanesulfonic acid; however, this is a costly procedure and would render any proposed commercial process un-economic.

Several problems exist with the conventional technology. Operation with a coupled system of titanium and cerium results in uncontrollable increases in acidity in the anolyte and increasing dilution with water and caustification of the catholyte. The addition of foreign chemicals to control the pH would result in a complete change in the nature of the electrolyte and precipitation of the cerium and/or titanium salts. As both cerium (III) and titanium (IV) are at saturation concentrations in the electrolyte, it would be most unlikely that adding additional salts would be beneficial.

Recently, since the development of ion exchange membranes, many attempts have been made to use both compartments to simultaneously produce reaction products in either chamber. In some instances, schemes have been proposed that carry out reactions at both electrodes in an undivided cell where the reactants and products are compatible and the presence of an anode does not impact the reduction process and vice versa. In each of these cases, a specific pair or group of organic substrates has been the proposed technology. For example, Weinberg, et al. have proposed that suitable oxidation reactions at the anode could be carried out in an electrochemical cell simultaneously with hydrodimerization reactions at the cathode.

It would be commercially advantageous to use both the anode and the cathode simultaneously to produce useful products, since two products can be manufactured in the same equipment. For a particular oxidation or reduction reaction in electrochemical cells using conventional electrolytes, the nonworking electrode usually produces gas; thus, the opportunity to make a useful product in both the anode compartment and the cathode compartment is lost. Moreover, the cell voltages are usually lower sometimes by as much as a volt, when an organic substrate is being reduced at a cathode or oxidized at an anode. In commercial electrosynthesis where complete cell voltages are usually in the range of 2-5 volts overall, one volt is a significant amount. Further, such a scheme avoids relegating one electrode as a nonworking electrode which usually produces gas, oxygen in particular has a high gassing overpotential on most electrodes and has the other disadvantage of creating excessive wear on the anodes.

The few processes proposed where two products have been synthesized in the same cell by an electrochemical route have been confined to direct electrochemical reactions or when one reaction or both have been direct or the second compartment has used a redox reagent. These processes do not involve carrying out the anode and cathode reactions in the same electrolyte solution.

With these difficulties in mind, it is an object of the present invention to provide an electrolyte with improved faradaic yield.

It is another object of the present invention to provide an electrolytic process wherein the conversion of tetravalent titanium into trivalent titanium and conversion of trivalent cerium to tetravalent cerium are achieved economically and with improved faradaic yield.

It is another object of the present invention to provide an electrolyte enabling the simultaneous generation of useful products at the anode and cathode.

It is another object of the present invention to provide an electrolyte containing a tetravalent salt of titanium wherein the titanium salt is more soluble than the known titanium containing electrolyte.

It is another object of the present invention to provide an electrolyte containing a tetravalent titanium salt and a trivalent cerium salt to yield a universal electrolyte for use as both anolyte and catholyte.

It is another object of the present invention to provide an electrolytic process enabling high current efficiencies with high conversion into trivalent titanium.

It is another object of the present invention to provide an electrocatalyst containing trivalent titanium which is very stable in the presence of methanesulfonic acid.

SUMMARY OF THE INVENTION

The present invention achieves these objects by combining in one electrolyte a mixture of trivalent cerium methanesulfonate and tetravalent titanium methanesulfonate, which can be used as both anolyte and catholyte. In this way, the rates of transfer of cerium (III) and water to the catholyte and methanesulfonate anion to the anolyte are counteracted by physical transfer from the respective reservoirs of anolyte to catholyte and of catholyte to anolyte. This electrolyte can then be used to generate, respectively, on a long term basis, ceric oxidant and titanuous reductant in the same electrochemical cell without the need for the aforementioned control of electrolyte inventory. The reagents can then be used to respectively oxidize and reduce a wide range of compounds.

In one form of the invention, the electrolyte may further comprise an organic co-solvent. In another form of the invention, the tetravalent salt of titanium may be present in an amount so as to form a solution saturated in said salt while at the same time, the solution may likewise be saturated with the trivalent cerium salt.

BRIEF DESCRIPTION OF THE DRAWINGS

The present invention will be better understood by reference to the appended figures wherein.

DESCRIPTION OF THE PREFERRED EMBODIMENTS

Figure 1:
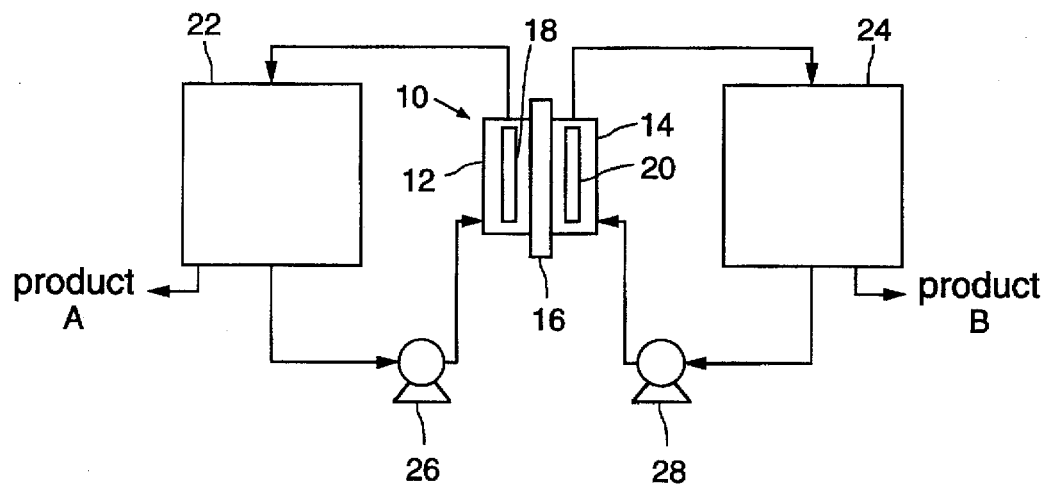
FIG. 1 is a schematic illustration of an electrochemical cell capable of carrying out a process according to the present invention.

The present invention relates to an electrolytic process for the simultaneous reduction of tetravalent titanium into trivalent titanium and oxidation of trivalent cerium into tetravalent cerium in the same electrochemical cell, wherein the anolyte comprises a trivalent cerium salt in solution in methanesulfonic acid and the catholyte comprises a tetravalent salt of titanium which is dissolved in a solution of methanesulfonic acid, the anolyte and catholyte being separated by a membrane, diaphragm, etc.

The invention also relates to a process for the reduction of organic compounds by reacting them with a solution of trivalent titanium in methanesulfonic acid.

As used herein, the term methanesulfonic acid is intended to encompass fluoromethanesulfonic acid, whenever used. Trifluoromethanesulfonic acid is a specific acid which may be used.

An advantage of the invention is that after the reduction of an organic compound, trivalent titanium is converted into tetravalent titanium. It is then possible to recycle the electrolyte into a cell to regenerate the trivalent titanium reducing agent.

Another advantage of the invention is that in the case of a simultaneous reduction of titanium(IV) and oxidation of cerium(III), the same acid can be used in both compartments of the cell. Since the solubility of the cerium and titanium ions is high in the acid used, it is possible to use a high current density with high faradaic/coulombic efficiency. Another advantage results from the fact of using the same acid to dissolve the salts which eliminates the problem of transport of anions through the membrane. The high solubility and the nature of the acid also ensures high reaction speeds.

The tetravalent salt of titanium is preferably selected from titanium oxysulfate, titanium tetrachloride and titanium oxymethanesulfonate, the oxysulfate being the most economically practical species. The cerium salt is preferably cerium methanesulfonate, which may be made by dissolving cerium carbonate or cerium oxalate in methanesulfonic acid.

The solution in which the salts are dissolved is preferably an aqueous solution, which in practice may be 0.2 to 15 molar, most preferably between 1 and 8 molar, of aqueous acid.

The concentration of the tetravalent salt of titanium may vary within a wide range, although a range of 0.4 to 1M or higher is preferred, while the concentration of the trivalent salt of cerium should be in the range of 0.1 to 2.5M.

In operating the electrolytic cell according to the invention for the reduction of tetravalent titanium into trivalent titanium and of cerous to ceric ion, the current density may vary, for example between about 100 and about 10,000 Amp/m$^2$, preferably between about 500 and 4000 Amp/m$^2$.

In this invention, organic substrates are oxidized in the anode compartment of an electrochemical cell, while simultaneously, other organic substrates may be reduced in the cathode compartment of the same cell. In effect, two substances are produced simultaneously in the same electrochemical reactor. The present invention utilizes a specific mixture of salts which permit the simultaneous but noninterfering reactions in the same electrolyte in a single cell. Thus, a single electrolyte according to the present invention can be used in both the anode and the cathode compartments of an electrochemical reactor.

The salts also act as concentrated redox reagents having great utility in commercial production of organic chemicals and pharmaceutical products. As the salts can be regenerated electrochemically, the reagents can be recycled many times, providing significant economic and environmental benefits.

Though the electrolyte is preferably aqueous, it may be advantageous to include therein an organic co-solvent which is miscible or immiscible in the aqueous solution. Such co-solvents will be selected to be inert for particular reactions. Those skilled in the art are familiar with relevant co-solvents (such as acetonitrile, dimethyl formamide, dimethylsulfonate) as are disclosed in U.S. Pat. No. 4,639,298, U.S. Pat. No. 4,670,108 and U.S. Pat. No. 4,701,245, the contents of each of which are incorporated herein by reference.

Figure 2:
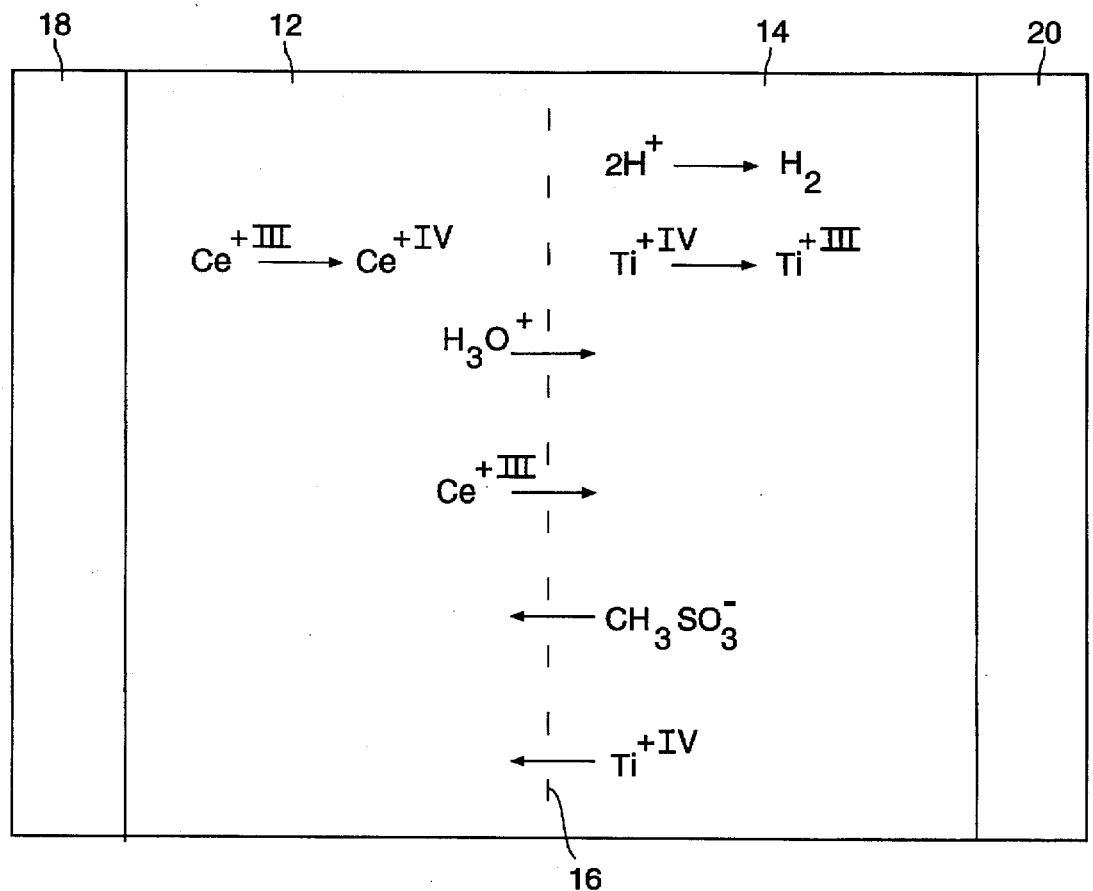
FIG. 2 depicts ionic transfer within an electrochemical cell as electrochemical synthesis according to the present invention is carried out.

A process according to the present invention can be generally described with reference to FIGS. 1 and 2.

The process is carried out in a divided electrochemical cell 10. The cell has two chambers 12, 14 separated by a ion exchange membrane 16. Chamber 12 houses an anode 18 and chamber 14 houses a cathode 20. Electrolyte is supplied to the cell from tanks 22, 24 via pumps 26, 28. Power is provided from a voltage source and electrical connections, not shown. A single electrolyte contains a concentrated mixture of titanium and cerium salts in an aqueous acid solution, such as methanesulfonic acid, and serves as both anolyte and catholyte.

In the anode compartment 12, the cerium in the electrolyte is electrolyzed to a reactive tetravalent state, but tetravalent titanium is unaffected. Tetravalent cerium is a powerful oxidizing agent. In the cathode compartment 14, the same mixture in the electrolyte is reduced to produce trivalent titanium, a powerful reducing agent. It was surprisingly found that these salts act as noninterfering redox reagents with respect to a variety of organic substrates. After the desired products, generally indicated as products A and B in FIG. 1, are formed, the redox reagents may be electrochemically regenerated.

During electrochemical synthesis, an organic substrate is oxidized in the anode compartment while another organic substrate is reduced in the cathode compartment. Thus, two substances are produced simultaneously in the same electrochemical reactor.

The invention is illustrated, but not limited, by the following examples.

EXAMPLE 1

1100 parts of cerium carbonatepentahydrate are suspended in 1500 parts of water to which 2498 parts of methanesulfonic acid is slowly added. The solution is completed by the addition of water to give 4 liters of solution. To this solution, which is preheated to 60° C. and vigorously agitated, 957.6 parts of titanium oxysulfate is added over a period of two days.

The electrolysis was carried out in a small DEM™ (ELECTROCATALYTIC INC.) plate and frame cell equipped with an anode of platinized titanium, and a cathode of graphite and an ion exchange membrane (NAFION™ 417). Portions of the above solution were used as both the anolyte and catholyte. The anolyte and catholyte were pumped simultaneously through their respective compartments of the electrochemical cell as shown in FIG. 1. A potential was applied across the anode and cathode sufficient to give a current of 20 A (current density 2 kA/m$^2$) for 160 minutes. At the end of the electrolysis the concentration of trivalent titanium in the catholyte compartment was 0.62M, a conversion of 63% and the concentration of tetravalent cerium in the anolyte was 0.673M, a conversion of 78%. A coulombic efficiency of 91% for the reduction of the titanium (IV) to titanium (III) was observed, while the coulombic efficiency for cerous to ceric oxidation was 98%.

| Summary | |
|---|---|
| Cell Conditions | |
| Electrode area | 100 cm$^2$ |
| Anode | platinized titanium |
| Cathode | graphite |
| Membrane | NAFION ™ 417 |
| Current | 20 A (current density 2.00 kA/m$^2$) |
| temperature | 60° C. |
| cell voltage | 4 V |
| electrolyte velocity | 0.055 m/s |
| Electrolyte | Concentration (M) |
| titanium(IV) | 1.0 |
| cerium(III) | 0.91 |
| methanesulfonic acid | 7.6 |
| Ti(III) | Coulombic efficiency at 63% conversion was 91%. |
| Ce(IV) | Coulombic efficiency at 78% conversion was 98%. |

EXAMPLE 2

The conditions of example 1 were repeated except that the applied current was 35 amperes and the electrolysis was 55 minutes in duration. At the end of the electrolysis, the concentration of trivalent titanium in the catholyte compartment was 0.58M, a conversion of 58%. The concentration of tetravalent cerium in the anolyte was 0.64M, a conversion of 72%. A coulombic efficiency of 85% for the reduction of the titanium(IV) to titanium(III) was observed, while the coulombic efficiency for oxidation of cerous to ceric was 85%.

| Summary | |
|---|---|
| Cell conditions | |
| Electrode area | 100 cm$^2$ |
| Anode | platinized titanium |
| Cathode | graphite |
| Membrane | NAFION ™ 417 |
| Current | 35 A (current density 3.50 kA/m$^2$) |
| temperature | 60° C. |
| cell voltage | 5.8 V |
| Electrolyte | Concentration (M) |
| titanium(IV) | 1.0 |
| cerium(III) | 0.91 |
| methanesulfonic acid | 7.6 |
| Ti (III) | Coulombic efficiency at 58% conversion was 86% |
| Ce (IV) | Coulombic efficiency at 72% conversion was 82% |

EXAMPLE 3

The conditions of example 1 were repeated except that the applied current was 30 amperes and the electrolysis was 105 minutes in duration. At the end of the electrolysis, the concentration of trivalent titanium in the catholyte compartment was 0.49M, a conversion of 50%. The concentration of tetravalent cerium in the anolyte was 0.50M, a conversion of 55%. A coulombic efficiency of 85% for the reduction of titanium(IV) to titanium (III) was observed, while the coulombic efficiency for oxidation of cerous to ceric was 83%.

| Summary | |
|---|---|
| Cell Conditions | |
| Electrode area | 100 cm$^2$ |
| Anode | platinized titanium |
| Cathode | graphite |
| Membrane | NAFION ™ 417 |
| Current | 30 A (current density 2.00 kA/m$^2$) |
| temperature | 60° C. |
| cell voltage | 5.8 V |
| Electrolyte | Concentration (M) |
| titanium (IV) | 1.0 |
| cerium (III) | 0.88 |
| methanesulfonic acid | 7.6 |
| Ti(III) | Coulombic efficiency at 58% conversion was 86%. |
| Ce(IV) | Coulombic efficiency at 72% conversion was 82%. |

Chemical Reductions

EXAMPLE 4

A solution of titanium(III) in methanesulfonic acid, prepared as described in example 1 above, was pre-heated to 60° C. in a jacketed glass vessel (with a capacity 2 liters) and agitated. To the pre-heated solution 8.35 grams of p-nitrotoluene was added. The resulting two phase mixture was vigorously agitated for 35 minutes until all the p-nitrotoluene was converted to p-aminotoluene with a chemical yield of 98% and a selectivity of titanium(III) use of 90%.

EXAMPLE 5

A solution of titanium(III) in methanesulfonic acid, prepared as described in example 2 above, was pre-heated to 60° C. in a jacketed glass vessel (with a capacity of 2 liters) and agitated. To the preheated solution 42.79 grams of diphenyl sulfoxide was added, the resulting two phase mixture was vigorously agitated for 55 minutes until all the diphenyl sulfoxide was converted to diphenyl sulfide with a chemical yield of 99% and a selectivity of titanium(III) use of 90%. After separation, the catholyte was recycled to the electrochemical cell (the coulombic efficiency was 86%). After subsequent re-electrolysis, the chemical reaction was completed a second and third time with equivalent results to those described above.

Trivalent titanium can also be used in the following chemical reactions:

1) nitrobenzenes to anilines, where the nitro benzene can be substituted at the o, m, or p position by any of the following groups: hydroxy, methoxy, ethoxy, phenoxy etc, chloro or other halogen, for example nitroquinoline, nitroisoquinolines, nitrocumolines, etc;

2) nitro-substituted polycyclic aromatic hydrocarbons such as nitronaphthalene to aminonaphthalene;

3) benzidines such as 2,3'-dinitrobenzodine to 2,3'-diaminobenzidine;

4) 3-nitrohydroxybenzoic acid to 3-amino-4-hydroxybenzoic acid;

5) alkene derivatives to alkyl analogues such as maleic acid and fumaric acid to succinic acid;

6) nitroparaffins to primary and secondary amines;

7) alkyl hydroxylamines to ketones;

8) o-nitro anilines cyclised to imidizoles;

9) ketones to alcohols;
10) cyclisation of

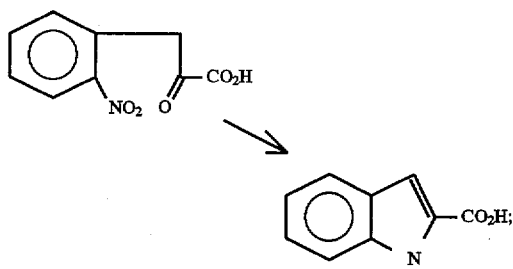

11) nitroimidozole to aminoimidozole;
12) coupling process: 4-methoxy-2-nitrotoluene to 2-amino-4-methoxybenzaldehyde

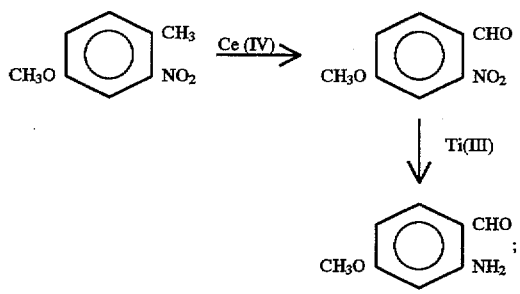

13) diphenylsulfoxide to diphenylsulfide;
14) acetophenone oxime or 1-bromo-acetophenone to acetophenone;
15) 3-chloro-2-noroboranone to norcamphor;
16) hydroxylamine reduction

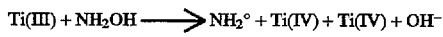

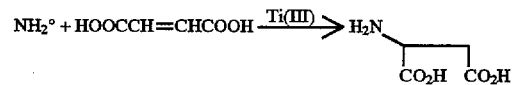

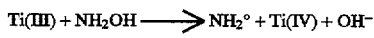

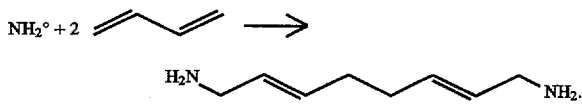

Tetravalent cerium can be used, for example, in the oxidation of aromatic compounds to form carbonyl-containing compounds such as quinones, aldehydes and ketones.

In a process according to the present invention, a mixture of titanium methanesulfonate and cerium methanesulfonate is converted to a reactive form by electrolysis. In the anode compartment of an electrochemical cell, the mixture is converted to ceric$^{+IV}$ methanesulfonic acid and the titanium$^+$ IV methanesulfonic acid is unaffected. The same mixture of titanium and cerium methanesulfonates when reduced in the other compartment of the cell produces titanium$^{+III}$ methanesulfonate, but does not affect cerium$^{+III}$ methanesulfonate present in the mixture therein.

Although the use of ceric methanesulfonate and titanium methanesulfonate have been described individually as redox reagents in the prior art, those skilled in the art of electro-organic synthesis would expect that the presence of two dissimilar transition metal salts in a single mixture would interfere with the respective reactions of each reagent in a single electrochemical cell. Thus, the use of a mixture of both salts in electro-organic synthesis would be expected to be unmanageable, without, for example, some means for controlling ion transfer and ion concentrations.

For example, a major concern would be the impossibility of making saturated solutions of ceric and titanium methanesulfonates at their respective solubility limits in the same solution. Running these solutions in an electrochemical cell, where the oxidation states of the ions were changing, would be a recipe for disaster as precipitations would be expected around the system. A precipitation on either electrode, for example, would shut the cell down.

Also, other problems would be expected. Cations crossing the cationic ion exchange membrane during electrochemical regeneration so that the concentrations would be expected to change in the catholyte and anolyte process streams, thereby unbalancing the electrolyte strengths and requiring special electrolyte management systems. The solubility of any of the redox ions would decrease, causing precipitates to form in the process stream. The presence of uninvolved cations could reduce the oxidizing ability of one cation and or the reducing power of the other, or both. In addition, the higher ionic strength of the mixed salts could adversely affect the solubility of the organic substrates or reaction products.

As illustrated by the above examples, none of these problems occurred. Surprisingly, use of cerium and titanium methanesulfonates in methanesulfonic acid produced a common electrolyte with each transition metal ion at its maximum concentration, irrespective of the presence of the other cation. Simultaneous oxidation and reduction reactions of a variety of substrates were accomplished, successfully overcoming problems of ion migration arising in conventional electrochemical techniques and enabling use of highly concentrated solutions.

While the present invention is disclosed by reference to the preferred embodiments and examples set forth above, it is to be understood that these examples are intended in an illustrative rather than a limiting sense. It is contemplated that modifications will readily occur to those skilled in the art, which modifications will be within the spirit of the invention and within the scope of the appended claims.

What is claimed is:

1. An electrolyte comprising a mixture of a tetravalent salt of titanium and a trivalent salt of cerium dissolved in a solution of methanesulfonic acid, wherein the concentration of trivalent cerium is from about 0.1 to about 2.5M.

2. An electrolyte according to claim 1, wherein said tetravalent salt of titanium is selected from the group consisting of titanium oxysulfate, titanium chloride and titanium oxymethanesulfonate.

3. An electrolyte according to claim 1, wherein said methanesulfonic acid is in solution in water.

4. An electrolyte according to claim 1, wherein said solution further comprises an organic co-solvent.

5. An electrolyte according to claim 1, wherein said tetravalent salt of titanium is present in an amount so as to form a solution saturated in said salt.

6. An electrolyte according to claim 1, wherein the concentration of said tetravalent salt of titanium is from about 0.4 to about 1M.

7. An electrolyte according to claim 1, wherein the concentration of said methanesulfonic acid is from about 0.2 to about 15M.

8. An electrolyte according to claim 7, wherein the concentration of said methanesulfonic acid is from about 1M to about 8M.

9. An electrolyte according to claim 1, wherein the trivalent salt of cerium is selected from the group consisting of cerium carbonate and cerium oxalate.

10. An electrolyte according to claim 1 wherein said methanesulfonic acid is fluoromethanesulfonic acid.

11. An electrolyte according to claim 1 wherein said methanesulfonic acid is trifluoromethanesulfonic acid.

12. An electrolytic process for the reduction of titanium (IV) to titanium(III) and oxidation of cerium(III) to cerium (IV), said process occurring in the same electrolytic cell, wherein an anolyte comprises a cerium(III) salt and a titanium (IV) salt in a solution and a catholyte comprises a titanium(IV) salt and a cerium(III) salt in said same solution, and wherein said solution comprises said cerium (III) salt in a concentration of from about 0.1 to about 2.5M and methanesulfonic acid.

13. A process according to claim 12, which comprises applying a current density of 100 to 10,000 Amp/m$^2$ at electrodes in said cell.

14. A process according to claim 13, which comprises applying a current density of 500 to 4000 Amp/m$^2$ at said electrodes.

15. A process according to claim 12, further comprising the steps of electrochemically regenerating the anolyte and the catholyte after the oxidation and reduction reactions and of recycling the regenerated anolyte and the regenerated catholyte for the oxidation and reduction reactions.

16. A process for the reduction of first organic compounds and oxidation of second organic compounds, comprising reacting Said first and second organic compounds with a solution of trivalent titanium and tetravalent cerium in methanesulfonic acid, wherein said solution is formed from a mixture containing trivalent cerium in a concentration of from about 0.1 to about 2.5M.

17. A process according to claim 16 for the reduction of nitrobenzenes into aromatic amines.

18. A process according to claim 16, for the reduction of sulfoxides into sulfides.

19. A process according to claim 16, wherein aromatic hydrocarbons are oxidized to form a member selected from the group consisting of quinones, aldehydes, ketones and carboxylic acids.

20. A process according to claim 16, wherein the concentration of said tetravalent titanium salt is from about 0.4 to about 1M.

21. A process according to claim 16, further comprising the steps of electrochemically forming a regenerated solution comprising Ti(III) and Ce(IV) and of recycling the regenerated solution for carrying out the reduction of the first organic substrate and oxidation of the second organic substrate.

* * * * *